US011391848B2

(12) United States Patent
Diggelen et al.

(10) Patent No.: US 11,391,848 B2
(45) Date of Patent: Jul. 19, 2022

(54) LOCALIZATION USING DOPPLER SHIFTS OF REFLECTED SIGNALS

(71) Applicant: Google LLC, Mountain View, CA (US)

(72) Inventors: Frank Van Diggelen, Carmel-by-the-Sea, CA (US); Imad Jean Fattouch, Mountain View, CA (US); David William Earle Orendorff, Costa Mesa, CA (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 17/004,771

(22) Filed: Aug. 27, 2020

(65) Prior Publication Data

US 2022/0066046 A1    Mar. 3, 2022

(51) Int. Cl.
*G01S 19/22* (2010.01)
(52) U.S. Cl.
CPC .................... *G01S 19/22* (2013.01)
(58) Field of Classification Search
CPC .............. G01S 19/22; G01S 19/428
See application file for complete search history.

(56) References Cited

U.S. PATENT DOCUMENTS

| 10,031,235 B2 * | 7/2018 | Kamijo ............... G01S 19/22 |
| 2008/0129598 A1 * | 6/2008 | Godefroy ............ G01S 19/428 |
| | | 342/450 |
| 2021/0223387 A1 * | 7/2021 | Wang .................... G01S 19/39 |
| 2021/0325548 A1 * | 10/2021 | Garin .................... G01S 19/40 |

* cited by examiner

*Primary Examiner* — Cassi J Galt
(74) *Attorney, Agent, or Firm* — Honigman LLP; Brett A. Krueger

(57) ABSTRACT

A method of Doppler-based localization includes establishing an estimated position for a moving receiver. The method also includes generating a plurality of candidate positions about the estimated position. Each candidate position corresponds to a possible actual location of the moving receiver. For each available satellite, the method includes receiving a measured Doppler effect for a signal from the respective available satellite caused by the moving receiver. For each available satellite, the method also includes, at each candidate position, determining a predicted direction of the signal based on ray-launching the signal to the respective satellite and generating a predicted Doppler effect for the moving receiver. The method further includes identifying a respective candidate position as an actual location for the moving receiver when, at the respective candidate position, the predicted Doppler effect for at least one satellite most closely matches the measured Doppler effect for the at least one satellite.

20 Claims, 7 Drawing Sheets

LOCALIZATION USING DOPPLER SHIFTS OF REFLECTED SIGNALS

TECHNICAL FIELD

This disclosure relates to localization using Doppler shifts of reflected signals.

BACKGROUND

Global Navigation Satellite Systems (GNSS) use radio signals transmitted by orbiting satellites to determine precise ground locations, enabling advanced navigation and location-based services. Typically, a GNSS receiver receives one or more radio signals transmitted by the orbiting satellites and the GNSS receiver, or a locational system associated with the GNSS receiver, is able to determine the position of the GNSS receiver based on the timing of messages received from satellite(s) (e.g., often at least four satellites). Each message specifies the time of transmission and the position of the satellite at the time of transmission. The receiver or the locational system can compute the time of transit for each received message and often, using navigation equations, the location of the receiver. The location of the receiver may then be utilized by various applications ranging from telecommunication to navigation. As the number of applications that incorporate some aspect of GNSS-based localization continues to grow, these applications rely on the GNSS-based localization to be not only accurate in an open-sky environment, but also an urban environment. This is especially true when urban environments are densely populated with users of location-based services that deploy GNSS-based localization.

SUMMARY

One aspect of the disclosure provides a method of localization using Doppler shifts of reflected signals. The method includes establishing, by data processing hardware, an estimated position for a moving Global Navigation Satellite Systems (GNSS) receiver in an environment. The method also includes generating, by the data processing hardware, a plurality of candidate positions about (e.g., around, surrounding, near, adjacent, etc.) the estimated position for the moving GNSS receiver. Each candidate position of the plurality of candidate positions corresponds to a possible actual location of the moving GNSS receiver. For each available satellite in communication with the moving GNSS receiver, the method includes receiving, at data processing hardware, a measured Doppler effect for a GNSS signal from the respective available satellite caused by the moving GNSS receiver. For each available satellite in communication with the moving GNSS receiver, the method also includes, at each candidate position of the plurality of candidate positions, determining, by the data processing hardware, a predicted direction of the GNSS signal based on ray-tracing the GNSS signal to the respective satellite and generating, by the data processing hardware, using the predicted direction of the GNSS signal, a predicted Doppler effect for the moving GNSS receiver. The method further includes identifying, by the data processing hardware, a respective candidate position as an actual location for the moving GNSS receiver when, at the respective candidate position, the predicted Doppler effect for at least one satellite most closely matches the measured Doppler effect for the at least one satellite. Here, the at least one satellite may refer to one satellite, two or more satellites, a set/collection of satellites, or all available satellites.

In some examples, the method further includes, at each candidate position of the plurality of candidate positions, assigning, by the data processing hardware, a likelihood to the corresponding candidate position indicating a measure of how closely the predicted Doppler effect at the corresponding candidate position for the available satellite matches the measured Doppler effect for the available satellite. In these examples, identifying the respective candidate position as the actual location for the moving GNSS receiver includes selecting the respective candidate position among the plurality of candidate positions that has a greatest assigned likelihood. The likelihood may include a difference between the measured Doppler effect and the predicted Doppler effect at the corresponding candidate position.

In some implementations, the method also includes determining, by the data processing hardware, a sum of squares between the predicted Doppler effect at the corresponding candidate position for at least one satellite and the measured Doppler effect for the at least one satellite. Here, the respective candidate position includes a minima for the sum of squares between the predicted Doppler effect at the corresponding candidate position for the at least one satellite and the measured Doppler effect at the corresponding candidate position for the at least one satellite.

In some configurations, the method further includes identifying, by the data processing hardware, the predicted Doppler effect that most closely matches the measured Doppler effect at the corresponding candidate position. In these configurations, the method also includes determining, by the data processing hardware, using the predicted Doppler effect identified as most closely matching the measured Doppler effect, a speed of the moving GNSS receiver.

Another aspect of the disclosure provides a system for localization using Doppler shifts of reflected signals. The system includes data processing hardware and memory hardware in communication with the data processing hardware. The memory hardware stores instructions that when executed on the data processing hardware cause the data processing hardware to perform operations. The operations include establishing an estimated position for a moving Global Navigation Satellite Systems (GNSS) receiver in an environment. The operations also include generating a plurality of candidate positions about (e.g., around, surrounding, near, adjacent, etc.) the estimated position for the moving GNSS receiver. Each candidate position of the plurality of candidate positions corresponds to a possible actual location of the moving GNSS receiver. For each available satellite in communication with the moving GNSS receiver, the operations include receiving a measured Doppler effect for a GNSS signal from the respective available satellite caused by the moving GNSS receiver. For each available satellite in communication with the moving GNSS receiver, the operations also include, at each candidate position of the plurality of candidate positions, determining a predicted direction of the GNSS signal based on ray-launching the GNSS signal to the respective satellite and generating, using the predicted direction of the GNSS signal, a predicted Doppler effect for the moving GNSS receiver. The operations further include identifying a respective candidate position as an actual location for the moving GNSS receiver when, at the respective candidate position, the predicted Doppler effect for at least one satellite most closely matches the measured Doppler effect for the at least one satellite. Here, the at least one satellite may refer to one satellite, two or more satellites, a set/collection of satellites, or all available satellites.

In some examples, the operations further include, at each candidate position of the plurality of candidate positions, assigning a likelihood to the corresponding candidate position indicating a measure of how closely the predicted Doppler effect at the corresponding candidate position for the available satellite matches the measured Doppler effect for the available satellite. In these examples, identifying the respective candidate position as the actual location for the moving GNSS receiver includes selecting the respective candidate position among the plurality of candidate positions that has a greater assigned likelihood. The likelihood may include a difference between the measured Doppler effect and the predicted Doppler effect at the corresponding candidate position.

In some implementations, the operations also include determining a sum of squares between the predicted Doppler effect at the corresponding candidate position for the at least one satellite and the measured Doppler effect for the at least one satellite. Here, the respective candidate position includes a minima for the sum of squares between the predicted Doppler effect at the corresponding candidate position for the at least one satellite and the measured Doppler effect at the corresponding candidate position for the at least one satellite.

In some configurations, the operations further include identifying the predicted Doppler effect that most closely matches the measured Doppler effect at the corresponding candidate position. In these configurations, the operations also include determining using the predicted Doppler effect identified as most closely matching the measured Doppler effect, a speed of the moving GNSS receiver.

Implementations of the aspects of the disclosure may include one or more of the following optional features. In some implementations, the plurality of candidate positions about the estimated position of the moving GNSS receiver defines a grid of positions. In some examples, the reflected GNSS signal includes a signal path having a plurality of reflections within the environment. Establishing the estimated position for the moving GNSS receiver includes obtaining the estimated position for the moving GNSS receiver from a locational system of a GNSS-enabled device associated with the moving GNSS receiver. In some configurations, determining the predicted direction of the GNSS signal based on ray-launching includes obtaining the predicted direction from a ray launching tool in communication with the data processing hardware. Here, the ray-launching tool may be configured to receive a building model for the environment and determine a location corresponding to the respective available satellite transmitting the GNSS signal. At each candidate position of the plurality of positions, the ray-launching tool is also configured to determine a ray that launches from the corresponding candidate position to the identified location of the respective available satellite and generate the predicted direction of the GNSS signal based on a signal angle for the determined ray that launches from the corresponding candidate position to the identified location of the respective satellite.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
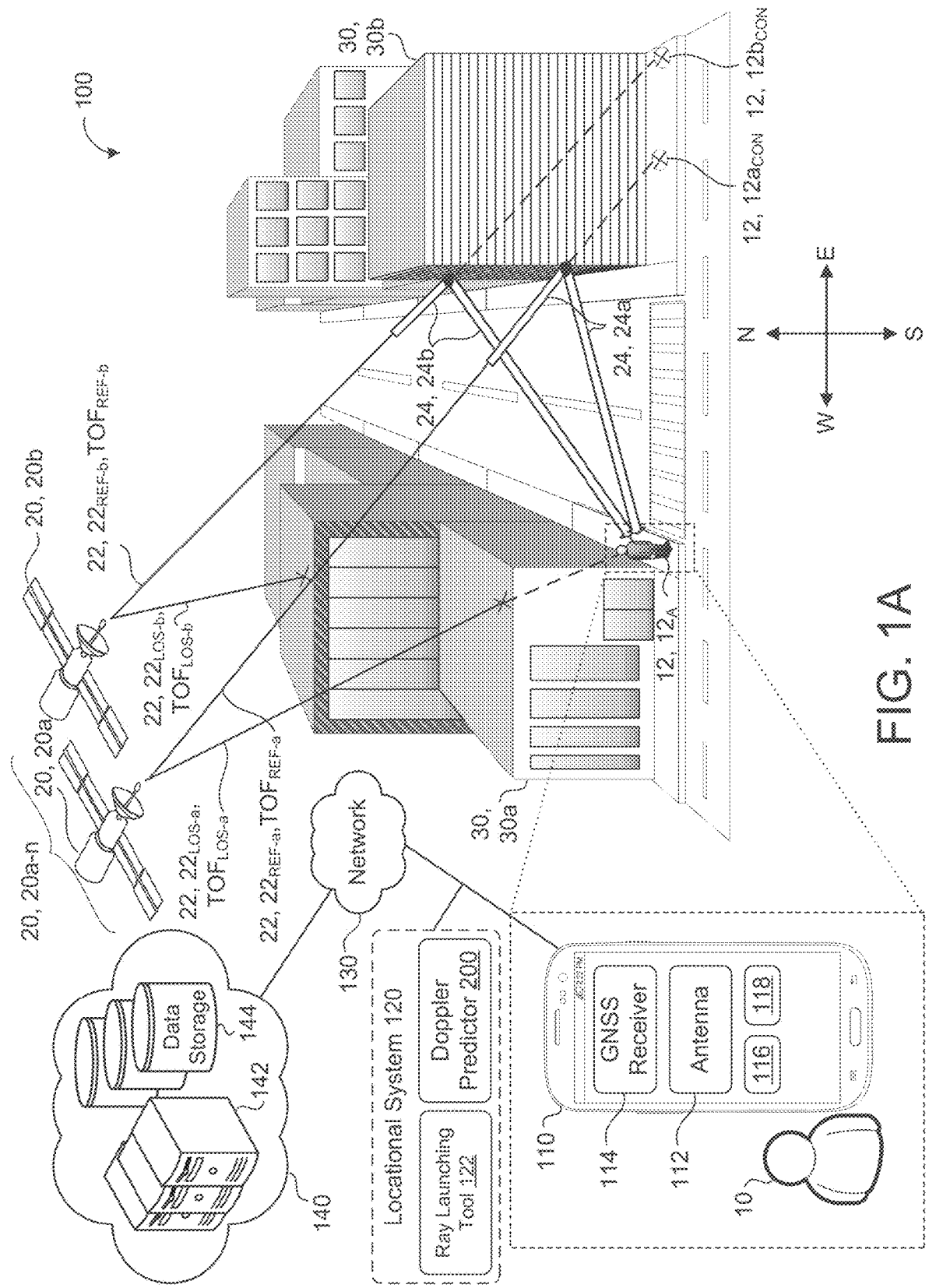
FIGS. 1A and 1B are perspective views of example urban environments where a GNSS receiver is located.

As GNSS-based localization has become a ubiquitous part of location-based services, GNSS receivers have been incorporated into numerous computing devices. With the incorporation of a GNSS receiver, a computing device is considered a GNSS-enabled device that may perform some role to support GNSS localization whether that be receipt of a signal transmitted by a satellite (i.e., a GNSS signal) or the entire computation of a location for the GNSS receiver. Here, GNSS localization refers to the function of determining the location of a GNSS component such as the GNSS receiver. Therefore, when a computing device includes a GNSS receiver, GNSS localization determines the location of the GNSS receiver and also, by association, may determine the location of the GNSS-enabled device. This allows GNSS localization to be implemented in order to locate almost any object outfit as a GNSS-enabled device. As a result, GNSS localization has been deployed to locate agriculture equipment, transportation vehicles (e.g., cars, trucks, trains, planes, etc.), mobile devices (e.g., mobile phones, laptops, tablets, etc.), wearables (e.g., smart watches), internet of things (IOT) devices, and/or other GNSS-enabled devices.

A GNSS receiver is configured to receive GNSS signals from one or more visible orbiting satellites. Here, a visible satellite or available satellite refers to a particular orbiting satellite that transmits a GNSS signal of sufficient magnitude for the GNSS localization process (e.g., by the GNSS receiver or a localization system associated with the GNSS receiver) to utilize in position and navigational determinations. In contrast, there may be other orbiting satellites that are non-visible orbiting satellites. A non-visible orbiting satellite or non-available satellite refers to a satellite for which the received GNSS signal is of insufficient magnitude to be utilized in position and navigational determinations in a GNSS localization process. Stated differently, an available satellite is considered "in communication with the GNSS receiver" because the GNSS receiver receives a GNSS signal of sufficient magnitude from an available or visible satellite. Although GNSS localization would prefer that satellites are visible (available) rather than not visible (not available), whether a satellite is visible (available) to a GNSS-enabled device or not may be contingent on the environment or terrain about a GNSS-enabled device. In other words, when a GNSS-enabled device is in an open field, the open-field environment includes little if any terrain features that may inhibit a GNSS receiver from receiving a signal transmitted by an orbiting satellite. For instance, numerous satellites are visible (available) in an open field. On the other hand, when a GNSS-enabled device is in a canyon surrounded by tall rock formations, there is likely to be only a small number of visible (available) satellites, if any, and a greater number of non-visible (non-available) satellites.

When a GNSS receiver is in a city or an urban environment, the GNSS receiver's ability to receive satellite signals is often more akin to a canyon than an open field. In a city or urban environment, the signals from one or more satellites may be blocked or attenuated by the structures or buildings of the city. To compound the issue that a GNSS receiver may have fewer visible (available) satellites in an urban environment, the signals from satellites that are visible to the GNSS receiver are more likely being redirected (e.g., reflected, refracted, diffracted, or scattered one or more times) in the urban environment (e.g., off of structures or by structures) during their path to the GNSS receiver. These redirected (e.g., reflected) signals pose issues to systems that perform GNSS localization (referred to as locational systems) because GNSS localization uses time of flight for the path of the signal and assumes that received signals, whether redirected (e.g., reflected) or not, are line of sight signals. In other words, a line of sight signal has a path that extends from the satellite to the receiver without any redirection. Since, in reality, the signal is a redirected signal and seldom a line of sight signal, the redirection of the signal actually causes the signal to travel a greater distance than a distance traveled by a line of sight signal. Here, the difference between a line of sight signal and the greater distance of the actual or reflected signal is referred to as excess path length. The term excess path length identifies that the path of the reflected signal to the receiver has a longer (i.e., "excess") path length due to its reflection(s) than the path would have had as a direct line of sight signal.

Unfortunately, the location system, which is configured to identify where the receiver is located, inherently makes the assumption that signals received at the receiver are line of sight signals, even if they are, in reality, redirected signals. With this assumption, the location system often inaccurately identifies the location of the receiver in an urban space. An example manifesting this inaccuracy is that rideshare platforms using the GNSS system of GPS have a tendency to believe that a rideshare customer is on the other side of the street in an urban setting. Here, the rideshare customer's GPS receiver interprets its location on the wrong side of the street due to the excess path length of the reflected signal and relays this incorrect location to the rideshare driver via the rideshare platform. Since it is fairly common for locational systems in an urban environment to determine the location of the GNSS receiver on the wrong side of the street due to the excess path length, the GNSS industry sometimes refers to this problem as "the-wrong-side-of-the-street" problem.

A few different approaches have attempted to address the issues of locational accuracy for a GNSS receiver in an urban environment. For example, the locational system may integrate or use an inertial system to improve the locational accuracy. In other words, the GNSS receiver or a device associated with the GNSS receiver may employ motion sensors, such as accelerometers and/or rate gyros. The locational system may then use the measurements from these sensors to determine a position for the GNSS receiver. Yet here, there are significant drawbacks to using an inertial system to supplement the localization. For instance, for the inertial system to be accurate at identifying a location of the GNSS receiver when reflected signals occur within an urban environment, the inertial system first needs an accurate determination of the GNSS receiver position. To initially begin with an accurate determination of the GNSS receiver position, the locational system would need a direct or line of sight signal that is not reflected to establish an initial GNSS receiver position for the inertial system. Without an accurate initial GNSS receiver position, the inertial system will lack an accurate reference state upon which to base its measurements. This approach therefore requires a relatively open area where GNSS signals may be received with no reflections prior to using the inertial system. The significant drawback with this approach is that, for pedestrians or even vehicles that start or reside entirely in the urban environment, a relatively open area is not available; causing the inertial system to be ineffective for supplemental localization when GNSS signals are being reflected in the urban environment. Additionally, an inertial system may increase cost, consume more processing resources, and/or occupy precious computing real estate for GNSS-enabled devices that have smaller envelopes. Furthermore, although mobile devices may have some existing inertial components (e.g., a mobile phone is able to determine its orientation), the inertial components in mobile devices, and particularly cellular phones, are rather rudimentary and incapable of performing localization to a high degree of accuracy.

Another approach to correcting locational inaccuracies for GNSS receivers in urban environments is referred to as shadow matching. Shadow matching is an approach that uses the signal strength received at a GNSS receiver to infer where the receiver is actually located. The premise is that if a signal from a satellite, for example, in the East has a weak signal strength detected at the GNSS receiver, it is presumed that the GNSS receiver is in a shadow of a building to the East. The premise is then applied in the aggregate to all satellites and their corresponding signals in order to converge on an estimated position for the GNSS receiver. Although this approach and variations to this approach have proven partially effective to correct locational inaccuracies for GNSS receivers in urban environments, the approach oversimplifies the cause of the issue. The signal strength received at a GNSS receiver may vary for reasons other than the signal being reflected off structures. For instance, the signal strength varies because the GNSS signal has to pass through a particular medium before reaching the receiver. In other words, the signal may be attenuated by foliage within the city or a body of a person carrying the GNSS receiver (e.g., the GNSS signal is a mobile device in a pocket of a person). Moreover, the type of GNSS receiver or type of GNSS-enabled device may also affect the signal strength for a GNSS signal. Without a way to account for these factors, shadow matching sometimes fails to be an effective approach for fixing the wrong-side-of-the-street problem on its own.

The locational inaccuracy may also be addressed by attempting to correct the excess path length that results in the GNSS receiver being perceived in the wrong location. Yet a correction approach may be difficult to implement because, in order to determine the excess path length of a reflected signal contributing to the locational error, the correction approach would need the location of the GNSS receiver; presenting a chicken-and-egg problem since the excess path length inherently obfuscates that location. One way of implementing a correction approach is to first approximate the location of the GNSS receiver and then, based on the approximate location and the signal strength of the GNSS signal at the GNSS receiver, the approach determines the excess portion of the path length for the reflected signal. The determined excess path length may then be, for example, provided as feedback to an entity responsible for the functionality of the GNSS receiver (e.g., a GNSS receiver chipset provider). By providing this feedback, the responsible entity may use the determined excess path length to improve the locational positioning functionality of the receiver in the future, eventually reducing locational errors caused by reflected signals. A setback to this approach is that it requires additional coordination (e.g., with the responsible entity), feedback loops between potentially multiple parties, and is an approach that is reliant on the accuracy of the estimated position of the GNSS receiver.

To overcome some of the deficiencies or difficulties with these approaches to improve locational accuracy of a GNSS receiver in an urban environment, a different approach has been developed that leverages the movement of the GNSS receiver. A GNSS signal from a satellite has a particular frequency. Yet when a moving GNSS receiver receives that signal, the particular frequency changes as a function of the GNSS receiver motion. In other words, a Doppler effect modifies the frequency of the GNSS signal based on the motion of the GNSS receiver. Doppler effect refers to a change in a frequency of a wave (e.g., sound or light) as the source of the wave (e.g., the satellite) and the destination of the wave (e.g., the receiver) move relative to one another. Here, this means that if the GNSS receiver is moving (e.g., a pedestrian walking or car driving), the motion of the GNSS receiver affects the frequency of the GNSS signal by some factor when compared to the GNSS signal being received by a stationary GNSS receiver. For instance, the velocity of a GNSS-enabled device having the GNSS receiver will change the apparent frequency of the received GNSS signal by the rate of wavelengths that the device moves through over some period of time. Since the frequency of the GNSS signal is known when the GNSS receiver is stationary, the change in frequency identifies the amount of Doppler effect that is impacting the frequency. From this Doppler effect, information about the motion (e.g., velocity) of the GNSS receiver and an angle at which the GNSS receiver is receiving the GNSS signal may be further derived. The derivation of the angle may then enable, for example, a locational system, to more precisely identify the location of the GNSS receiver. By utilizing the Doppler effect at the GNSS receiver, this Doppler-based approach may accurately identify the position of the GNSS receiver. Since the Doppler-based approach does not rely on signal strength of the GNSS signal, the Doppler-based approach may enable the locational system to be effective even when the signal is being attenuated by other factors that commonly plague techniques like shadow-matching (e.g., the signal passing through additional mediums or the type of device associated with the GNSS receiver). Furthermore, due to the Doppler-based approach being dependent on a moving GNSS receiver, the Doppler-based approach allows a locational system to identify a speed and/or a direction of travel for the GNSS receiver in addition to an accurate position for the GNSS receiver.

Figure 1B:
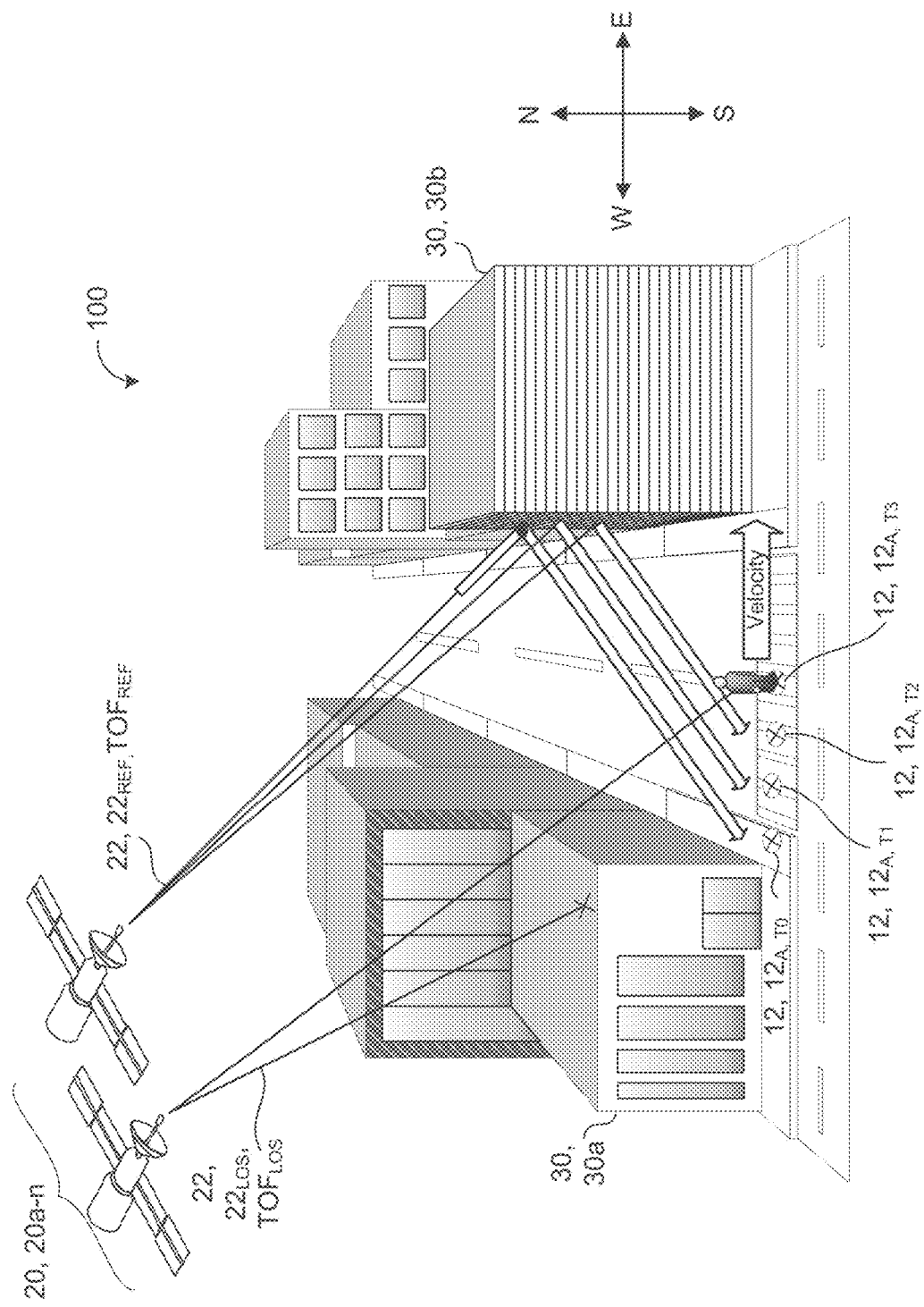
Figure 1C:
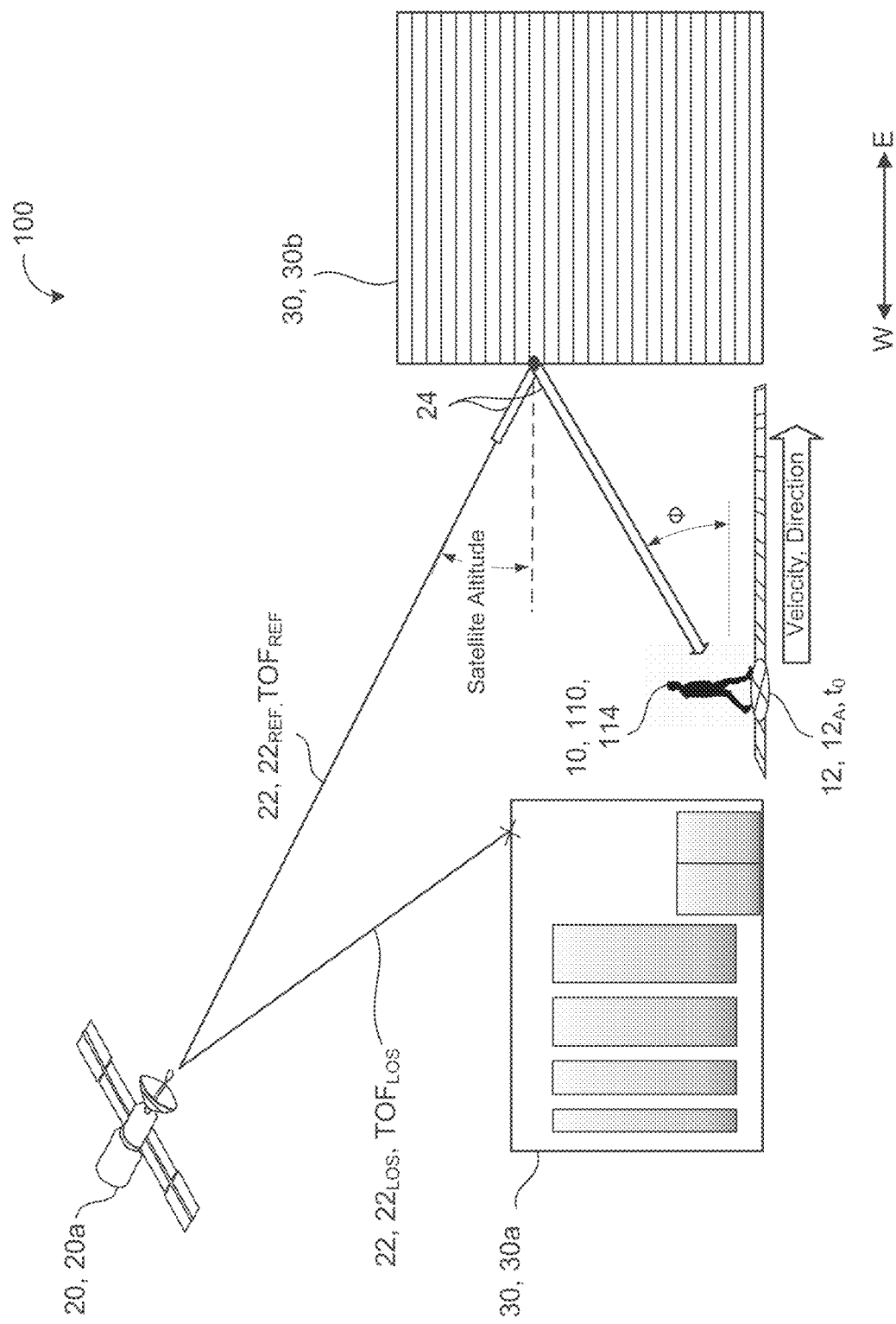
FIG. 1C is a schematic view of an example Doppler effect for a moving GNSS receiver in the urban environment of FIG. 1B.

FIGS. 1A-1C are examples of an urban environment 100 where a GNSS-enabled device 110 (also referred to as a device 110) associated with a user 10 receives GNSS signals 22 transmitted from one or more satellites 20, 20a-n. For instance, FIG. 1A depicts two visible satellites 20, 20a-b. Here, each satellite 20 is shown transmitting a line of sight signal 22, $22_{LOS}$ blocked by buildings 30 in the urban environment 100 and a reflected signal 22, $22_{REF}$ reflecting off a building 30, 30b in the environment 100 before it reaches the device 110 at the user 10. Although only one or two satellites 20 are depicted among the figures for simplicity, the GNSS-enabled device 110 may be configured to receive signals 22 at an antenna 112 associated with a GNSS receiver 114 transmitted from any GNSS satellite 20 within any of the GNSS constellations of satellites 20. In other words, the GNSS receiver 114 of the device 110 may receive signals 22 transmitted from satellites 20 associated with the Global Positioning System (GPS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS), and/or any similar systems, such as Low Earth Orbit or Geostationary satellites configured to transmit wireless signals. Moreover, although FIGS. 1A-1C depict an urban environment 100, this is merely for illustration. The systems and methods herein may function in any environment such as a non-urban and/or semi-urban environment.

The device 110 includes an antenna 112 and a GNSS receiver 114 (also referred to as receiver 114). The antenna 112 is configured to function as an interface to receive a transmitted signal 22 (e.g., radio waves) from satellite 20 and to communicate the received signal 22 as an electrical input to the receiver 114. Generally speaking, based on the electrical input from the antenna 112, the receiver 114 is configured to interpret the message embodied in the received signal 22. With respect to a GNSS signal 22, the message typically indicates timing information (e.g., when the signal 22 was transmitted by the satellite 20) and positional information (e.g., information regarding the position of the satellite 20 when the transmission was sent). Front the information, a locational system 120 in communication with the receiver 114 determines a location 12 of the recipient of the signal 22. In the examples shown, the location of the recipient of the signal 22 is the location of the receiver 114, the device 110, and the user 10 since the receiver 114 is a component of the device 110 and the device 110 (e.g., shown as a mobile phone) is being carried by the user 10. Due to the synonymous locations of the device 110, the receiver 114, and the user 10 in these examples, the locations of these terms may be referred to interchangeably although it is conceivable that these locations may differ in other examples. For instance, the device 110 is a driver-less, self-driving vehicle with a GNSS receiver 114.

The device 110 may be any computing device capable of supporting the receiver 114. For instance, the device 110 is configured to support logic, circuitry, and/or code that is configured to determine its own location in response to a signal 22 from a satellite 20. Some examples of devices 110 include mobile devices (e.g., a mobile phone, laptop, tablet, mobile navigation device, etc.), vehicle electronics (e.g., vehicle control modules, avionics, boat electronics, etc.), wearables (e.g., smart watches or smart glasses), gaming devices, audio/video capturing devices (e.g., cameras or video cameras), and/or IoT devices (e.g., smart consumer electronics, smart appliances, smart speakers, smart home devices, smart meters, etc.). The device 110 includes data processing hardware 116 and memory hardware 118 in communication with the data processing hardware 116 and storing instructions, that when executed by the data processing hardware 116, cause the data processing hardware 116 to perform one or more operations (e.g., related to GNSS localization). In some examples, the device 110 includes one or more applications (i.e., software applications) where each application may utilize the locational system 120 associated with device 110 to perform various functions within the application. For instance, the device 110 includes a navigation application configured to display the location 12 of the device 110 for the user 10.

Furthermore, the device 110 may be configured to communicate via a network 130 with a remote system 140. The remote system 140 may include remote resources, such as remote data processing hardware 142 (e.g., remote servers or CPUs) and/or remote memory hardware 144 (e.g., remote databases or other storage hardware). The device 110 may utilize the remote resources to perform various functionality related to GNSS localization. For instance, the device 110 is configured to perform GNSS localization using the locational system 120 and/or a Doppler predictor 200. These systems 120, 200 may reside on the device 110 (referred to as on-device systems) or reside remotely (e.g., reside on the remote system 140), but in communication with the device 110. In some examples, some of the systems 120, 200 reside locally or on-device while others reside remotely. In other words, any of these systems 120, 200 or their functionality may be local or remote in any combination. For instance, when a system 120, 200 is rather large in size or processing requirements, the system 120, 200 may reside in the remote system 140. Yet when the device 110 may support the size or the processing requirements of one or more systems 120, 200, the one or more systems 120, 200 may reside on the device 110 using the data processing hardware 116 and/or the memory hardware 118. Optionally, the one or more of the systems 120, 200 may reside on both locally/on-device and remotely. For instance, one or more of the systems 120, 200 may default to execute on the remote system 140 when a connection to the network 130 between the device 110 and remote system 140 is available, but when the connection is lost or the network 130 is unavailable, the systems 120, 200 instead execute locally on the device 110.

The device 110 is in communication with a locational system 120 that is configured to perform GNSS localization for the receiver 114 and/or the device 110. The locational system 120 generally includes a ray launching tool 122 and the Doppler predictor 200. FIG. 1A depicts the locational system 120 in a dotted outline to indicate that the ray launching tool 122 and/or the Doppler predictor 200 may not reside together (e.g., on the device 110 or the remote system 140). For instance, the ray launching tool 122 may be an application (e.g., an application programming interface (API)) hosted on the remote system 140, but accessible to the device 110, while the Doppler predictor 200 resides on the device 110.

The ray launching tool 122 is tool that is configured to identify an angle (e.g., shown as Φ in FIG. 1C) of a reflected signal $22_{REF}$ being received at the receiver 114 based on a hypothesized position for the receiver 114. Ray launching generally refers to a method of simulating a ray or path for a signal 22. Here, given a hypothesized position (e.g., an x-y position on Earth's surface), the ray launching tool 122 simulates the path for the signal 22 from a satellite 20 by propagating rays from multiple directions from the hypothesized position By launching each of the propagated rays in each direction, the ray launching tool 122 models whether a particular ray terminates at the known location for the satellite 20. In other words, since satellites 20 broadcast their position in their signal transmissions, the ray launching tool 122 attempts to work backwards and trace a ray from a hypothetical position of a recipient of a signal 22 to a broadcasted location of a satellite 20. When a ray terminates at a known satellite location, the ray launching tool 122 identifies the ray as a path for the signal 22 and determines the angle (e.g., the signal angle Φ) at which this ray reflects along its path before terminating at the receiver 114. To accurately ray launch for the urban environment 100, the ray launching too) 122 has access to or obtains a structure model or building model for the urban environment 100. For instance, the structure model includes building dimensions and characteristics of structures within the urban environment 100. The structure model informs the ray launching tool 122 in what propagated direction will a ray encounter a structure that would reflect the ray and in what manner the characteristics of the structure will likely reflect the ray.

The locational system 120 uses the functionality of the ray launching tool 122 to understand a reflected signal $22_{REF}$ with an excess path length 24. Referring further to FIG. 1A, each reflected signal $22_{REF-a,b}$ from the first and second satellites 20a-b includes an excess path length 24 (e.g., shown as a first excess path length 24, 24a and a second excess path length 24, 24b). As previously stated, the excess path length 24 is the difference between a length of the reflected signal $22_{REF}$ and a length of a line of sight signal $22_{LOS}$ from the same satellite 20. For instance, FIG. 1A depicts the length of the line of sight signal $22_{LOS}$ for the first satellite 20a as a combination of the dotted line that terminates at the user 10 and the solid line terminating at the first building 30, 30a. Based on this line of sight signal length, the excess path length 24a for the reflected signal $22_{REF}$ from the first satellite 20a is shown as the block portion along the reflected signal 22, $22_{REF-a}$. The excess path length 24, 24b for the second satellite 20b is shown in a similar manner.

In a system that performs conventional GNSS localization, the conventional system would identify the time-of-flight $TOF_{REF}$ for the signals 22 actually received at the receiver 114 (e.g., the reflected signals $22_{REF}$ that are not blocked by buildings 30) and interpret the location 12 of the device 110 at the conventional positions 12, $12a\text{-}b_{CON}$ shown in FIG. 1A. In other words, the conventional system assumes the signal 22 is a line of sight signal $22_{LOS}$ rather than a reflected signal $22_{REF}$ and simply calculates the conventional position $12_{CON}$ as a straight line extension of the excess path length 24. For multiple signals 22 received at a receiver 114, GNSS localization would combine the determined location 12 for each satellite 20 to form an aggregate position. Here, the conventional system would combine the first conventional position 12, $12a_{CON}$ and the second conventional position 12, $12b_{CON}$ to form an aggregate position. As can be seen from FIG. 1A, a GNSS localization process performed in a conventional manner would interpret the receiver 114 as being located on the wrong side of the street compared to the actual position 12, $12_A$ of the receiver 114.

To overcome the inaccuracies of a conventional GNSS localization system, the locational system 120 identifies whether a signal 22 received at the receiver 114 is a line of sight signal $22_{LOS}$ or a reflected signal $22_{REF}$ (e.g., using the ray-launching tool 122) and uses a Doppler-based approach (e.g., with the Doppler predictor 200) to determine the actual location 12, $12_A$ of the receiver 114. Referring to FIGS. 1B and 1C, a Doppler-based approach enables the locational system 120 to accurately identify the location 12 of the receiver 114 when the receiver 114 is moving. For example, GPS devices are able to measure the speed of a vehicle on an open road (i.e., in an open environment) to very accurate precision using the Doppler effect. In this example, a GPS device in a vehicle receives a signal 22 from a satellite 20. The received signal 22 indicates the location of the satellite 20 transmitting the signal 22 and the GPS device is able to determine the frequency of signal 22. With the location of the satellite 20, the GPS device determines the altitude (i.e., the angle of elevation from the ground plane of the road surface) between the satellite 20 and the vehicle. Here, the value for the altitude is quite accurate (e.g., to one thousandth of a radian) due to the extreme distance between the moving vehicle and the satellite 20. For instance, a satellite 20 at medium Earth orbit is over ten thousand miles from the vehicle. Since the vehicle is moving, the movement of the vehicle causes a Doppler effect where the frequency of a signal 22 is a function of a speed of an object (e.g., the speed of the vehicle). Because the Doppler effect or frequency change is an expression of the rate of wavelengths that the moving object moves through over some period of time, the speed may be derived from the Doppler effect as a function of the measured frequency change of the Doppler effect divided by the component of the angle of the signal (e.g., altitude) along the direction of the moving object. For example, the following equations represent the Doppler effect.

$$\text{Doppler Effect} = (\text{speed}) \times (\cos(\Phi)) \qquad (1)$$

$$\text{Speed} = \frac{\text{Doppler Effect}}{Cos(\Phi)} \qquad (2)$$

where the Doppler effect is the change of frequency between a non-moving object at a particular location and a moving object at that same location, the speed is the rate at which the object is moving, and $\Phi$ is the angle of the signal (e.g., the altitude of the satellite transmitting the signal in the open environment, or a combination of altitude and azimuth angles).

Yet applying the principles of the Doppler effect for an urban environment becomes more complicated. For example, the angle of the signal is not a direct line of sight signal $22_{LOS}$ like in the vehicle example, but rather often a reflected signal $22_{REF}$ that, due to the reflection(s), has an angle that is different than simply the altitude of the satellite 20 (e.g., as shown in FIG. 1C). For instance, FIG. 1B illustrates that, as the user 10 walks across a street in a cross-walk between buildings 30, 30a-b, the reflected signal $22_{REF}$ may change as the user 10 changes locations 12 over time t. In other words, due to the moving receiver 114, the paths of the received signals 22 and the manner in which the signals 22 are redirected or reflected to the receiver 114 changes. Here, FIG. 1B depicts four instantaneous locations 12, $12_A$, $t_0$-$t_3$ of the receiver 114 as the user 10 moves over a period of time t (e.g., shown as four time steps $t_0$-$t_3$). Moreover, FIG. 1B shows that as the receiver 114 moves in the urban environment 100, the signal(s) received by the receiver 114 may change from a reflected signal $22_{REF}$ to a line of sight signal $22_{LOS}$ (and vice versa). For instance, FIG. 1B illustrates that, when the user 10 is in a more open city space, such as the middle of an intersection, when compared to closer to buildings 30, the receiver 114 is able to receive a line of sight signal $22_{LOS}$ from the first satellite 20a. In some examples, such as FIG. 1B, some visible satellites 20 transmit line of sight signals $22_{LOS}$ to the receiver 114 due to the satellite orbit while other satellites 20 transmit reflected signals $22_{REF}$ to the receiver 114. Since a satellite 20 broadcasts its signals 22 generally in a conical shape, the receiver 114 may receive multiple signals 22 from the same satellite 20 where the signals 22 may be some combination of a reflected signals $22_{REF}$ (e.g., any number of reflections throughout the cityscape) and a line of sight signal $22_{LOS}$.

FIG. 1C is a two-dimensional view of the user 10 traveling in an easterly direction at a particular speed (e.g., velocity). In this depiction, the reflected signal $22_{REF}$ being received by the receiver 114 at a signal angle $\Phi$ that is different from the altitude of the satellite 20 due to its reflection off of the second building 30, 30b. Here, because the user 10 (i.e., the receiver 114) is traveling toward the signal 22, the Doppler effect will increase the frequency of the signal 22 by a factor of the speed of the user 10 multiplied by cosine of the angle $\Phi$ between the direction of the user 10 and the angle 22, $22_A$ of the signal 22. In contrast, if the user 10 were traveling away from the signal 22, the Doppler effect will decrease the frequency of the signal 22. For instance, if the user 10 travels in the opposite, westerly direction, the frequency decreases. The frequency changes by a factor of the speed of the user 10 multiplied by cosine of the angle $\Phi$ between the direction of the user 10 and the angle $22_A$ of the signal 22 where the angle $\Phi$ would be equal to one hundred and eighty degrees less the angle depicted in FIG. 1C, and the cosine of this angle is negative, corresponding to a decrease in the measured frequency.

Figure 2A:
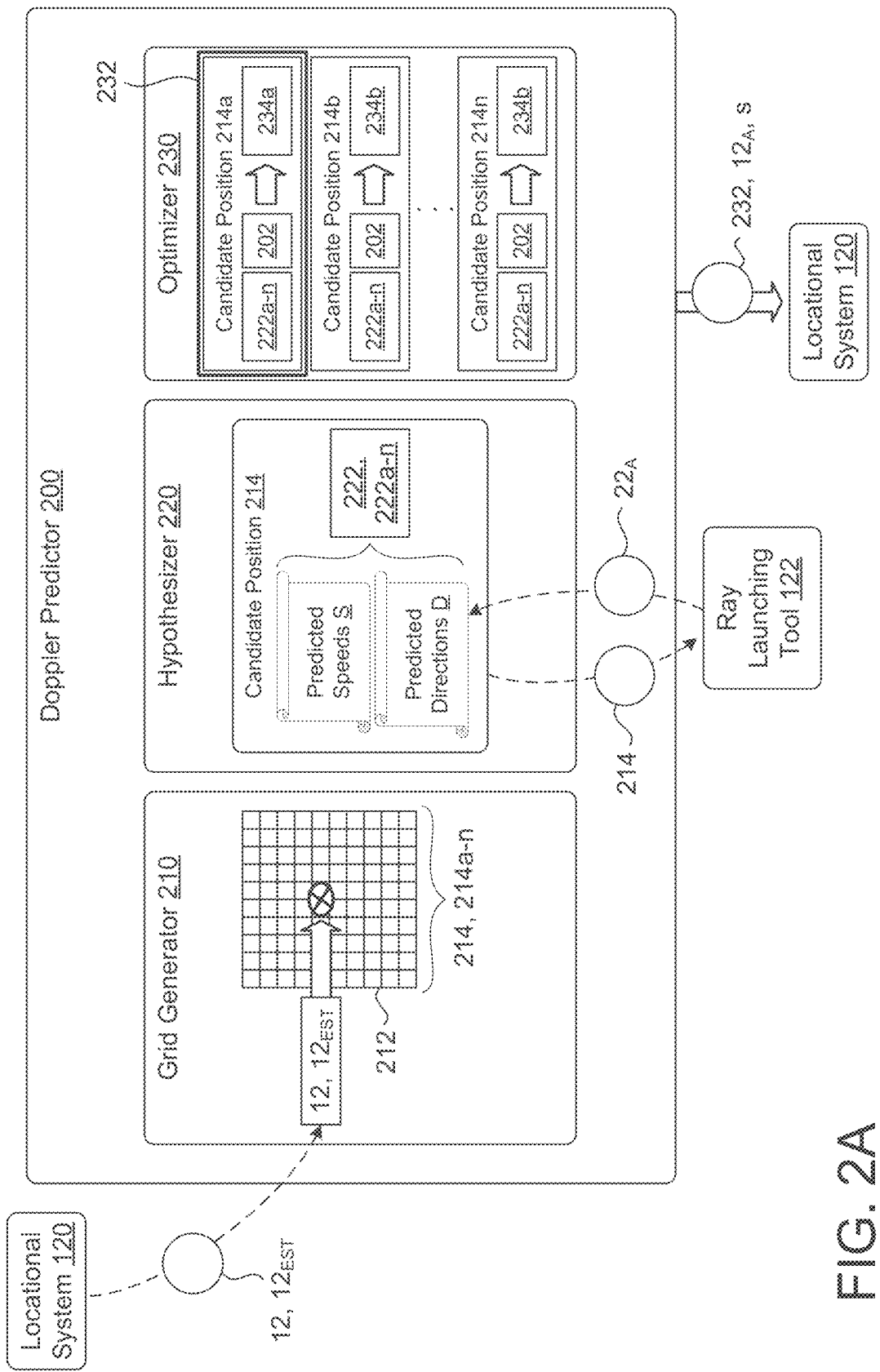
FIGS. 2A and 2B are schematic views of an example Doppler predictor as shown in FIG. 1A.
Figure 2B:
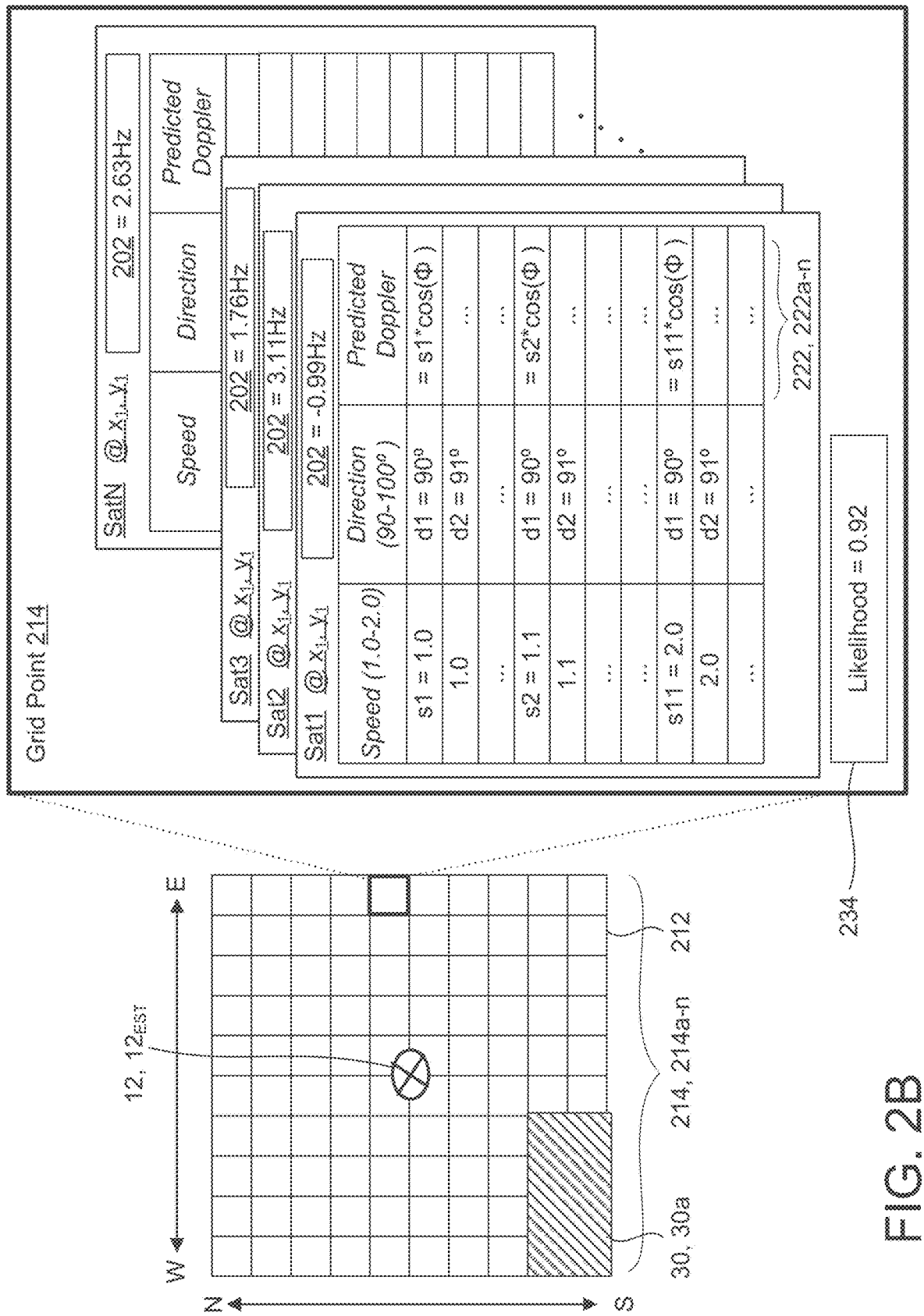

Referring to FIGS. 2A and 2B, the Doppler predictor 200 of the localization system 120 is configured to estimate an initial location 12, $12_{EST}$ for the receiver 114, to generate a plurality of candidate actual locations 214, 214a-n for the receiver 114, and, from the plurality of candidate actual locations 214, to determine the best candidate actual location 214 for the receiver 114 based on a comparison between a measured Doppler effect 202 of a signal 22 at the receiver 114 and a predicted Doppler effect 222 generated by the Doppler predictor 200. To perform these operations, the Doppler predictor 200 may generally include a grid generator 210, a hypothesizer 220, and an optimizer 230.

In some examples, the grid generator 210 receives an estimated location $12_{EST}$ (also referred to as an estimated position) from the locational system 120. For instance, the estimated location $12_{EST}$ may correspond to a location 12 where a conventional GNSS localization system believes the receiver 14 to be located (e.g., the conventional location $12_{CON}$ based on a line of sight assumption for the signal 22). In other examples, the grid generator 210 generates the estimated location $12_{EST}$ itself (e.g., based on conventional GNSS localization). In either approach, with the estimated location $12_{EST}$, the grid generator 210 generates a plurality of positions about the estimated location $12_{EST}$ (i.e., adjacent to or radiating outward from the estimated location $12_{EST}$) where each position of the plurality of positions corresponds to a candidate position 214 for the actual location $12_A$ of the moving receiver 114. Therefore, although the conventional location $12_{CON}$ for the receiver 114 is inaccurate, this conventional location $12_{CON}$ is unlikely to be so grossly inaccurate that the plurality of candidate positions 214 would not include the actual position $12_A$. Moreover, if this appears to be the case, the grid generator 210 may be configured to adjust the resolution regarding the size of each candidate position 214 and/or the number of candidate positions 214 that are generated about the estimated location $12_{EST}$. In some examples, in order to ensure that each position about the estimated location $12_{EST}$ is systematically analyzed, the grid generator 210 generates the plurality of the candidate positions 214 as a grid 212 where each point in the grid 212 represents a candidate position 214. For instance, FIGS. 2A and 2B illustrate a grid 214 where the center of the grid 214 is the estimated location $12_{EST}$ with candidate positions 214 generated in each direction about the estimated location $12_{EST}$ (e.g., northerly, southerly, easterly, and westerly). The grid 212, or, more generally the plurality of candidate positions 214, represents potential locations where the receiver 114 may be located on the plane parallel to Earth's surface. In some implementations, when the grid generator 210 generates the plurality of candidate positions 214, the grid generator 210 may also model or take into account buildings 30 or other structures. For instance, the grid generator 210 may ignore generating a candidate position 214 where it knows there is a building 30 or other structure. For example, the grid 212 shown in FIG. 2B depicts the top of the first building 30a.

The hypothesizer 220 is configured to receive the plurality of candidate positions 214 and to hypothesize or to predict what the Doppler effect would theoretically be at each candidate position 214. Stated differently, the hypothesizer 220 determines one or more predicted Doppler effects 222, 222a-n for each candidate position 214 such that the optimizer 230 is able to identify a best candidate position 232 from the plurality of candidate positions 214. In order to generate the predicted Doppler effect 222, the hypothesizer 220 needs to have some understanding of the speed of the moving receiver 114 and the angle Φ between the direction of the receiver 114 and the angle $22_A$ of the signal 22 from a satellite 20. Because both the speed and the direction of the receiver 114 are often unknown to the receiver 114 and/or the locational system 120, the hypothesizer 220 may generate a predicted speed "s" and a predicted direction "d." In some examples, the hypothesizer 220 generates a range of predicted speeds s and a range of predicted directions in order to ensure that these predictions likely include a relatively close approximation of the actual speed and the actual direction for the receiver 114 (i.e., result in an accurate predicted Doppler effect 222). For instance, the range of directions d correspond to azimuth starting clockwise from true North.

Since the Doppler effect is computed using the angle Φ between the direction d of the receiver 114 and the angle $22_A$ of the signal 22 from a satellite 20, the hypothesizer 220 leverages the capabilities of the ray-launching tool 122 to identify the likely angle $22_A$ of a signal 22 transmitted by a satellite 20 to the receiver 114. For instance, the hypothesizer 220 passes the candidate position 214 (e.g., x-y coordinates of corresponding to the candidate position 214) to the ray-launching tool 122 and the ray launching tool 122 performs ray launching to determine a predicted direction for a signal 22 received at the receiver 114, if the receiver 114 was located at that candidate position 214. For example, front the candidate position 214, the ray launching tool 122 determines an angle $22_A$ of a signal 22 that traces to a satellite 20 transmitting a signal 22 received by the receiver 114. Using this signal angle $22_A$ and the predicted direction d, the hypothesizer 220 is able to determine the angle Φ that contributes to the predicted Doppler effect 222. As shown in FIG. 2B, at each candidate position 214, the receiver 114 may be receiving signals 22 from multiple satellites 20a-n (e.g., the first satellite 20a and the second satellite 20b). Therefore, the hypothesizer 220 is configured to determine a predicted Doppler effect 222 for each satellite 20 for each speed s and direction d at each candidate position 214 (e.g., by using equation (1)). By having a predicted Doppler effect(s) 222 for each satellite 20, the optimizer 230 is able to compare the measured Doppler effect 202 for a signal 22 from a satellite 20 to the predicted Doppler effect 222 for that satellite 20.

The optimizer 230 is configured to receive the predicted Doppler effects 222 for each candidate position 214 and to identify the candidate position 214 whose predicted Doppler effect(s) 222 most closely matches the measured Doppler effect 202 for all satellites from which the receiver 114 received signals 22 (i.e., visible satellites 20). Here, the optimizer 230 determines that the candidate position 214 whose predicted Doppler effect 222 most closely matches the measured Doppler effect 202 is the best candidate position 232 and relays this best candidate position 232 as the Doppler predictor's 200 determination of the actual location $12_A$ for the receiver 114. Additionally or alternatively, the optimizer 230 may identify that a predicted speed s at the best candidate position 232 closely approximates the actual speed of the moving receiver 114. Here, the optimizer 230 may communicate this predicted speed s at the best candidate position 232 to other components such as the locational system 120, the device 110, or the receiver 114.

In some implementations, when the optimizer 230 compares the measured Doppler effect 202 to the predicted Doppler effect 222 at each candidate position 214, the optimizer 230 assigns a likelihood 234 to the candidate position 214 that indicates how closely the predicted Doppler effect 222 matches the measured Doppler effect 202. For instance, the greater the likelihood 234 for a candidate position 214, the more closely the predicted Doppler effect 222 matches the measured Doppler effect 202 (or vice versa). One such example is that the likelihood 234 represents the difference between the predicted Doppler effect 222 and the measured Doppler effect 202. In some configurations, the likelihood 234 is similar to a best fit model or regression model that identifies the variance of the predicted Doppler effect 222 to the measured Doppler effect 202. For example, the likelihood 234 represents a sum of squares or least squares regression model between the predicted Doppler effect 222 and the measured Doppler effect 202. When the optimizer 230 assigns a likelihood 234 to each candidate position 214, the optimizer 230 may identify the best candidate position 232 by selecting the candidate position 214 with an extrema. In other words, when the likelihood 234 represents a sum of squares, the best candidate position 232 is the candidate position 214 with a minima. Yet when the likelihood 234 represents a score, the best candidate position may be the candidate position 214 with the maximum score as its likelihood 234.

With continued reference to FIG. 2B, FIG. 2B illustrates a simplified example of a single grid point or candidate position 214. Here, the candidate position 214 includes a series of tables where each table represents the predicted Doppler effects 222a-n for a range of predicted speeds s, s1-s11 and a range of predicted directions d, d1-d11 designated by the hypothesizer 220 at the coordinate position 214 of $x_1$-$y_1$. Although FIG. 2B illustrates a series of tables, the series of tables are for instructional purposes to depict that, for each candidate position 214, the Doppler predictor 200 generates a predicted Doppler effect 222 for each satellite for each combination of predicted speeds s and predicted directions d. In reality the Doppler predictor 200 may compile these determinations in a single table or some other format. In this example, the hypothesizer 220 has chosen a range of predicted speeds s ranging from 1.0 m/s to 2.0 m/s and a range of predicted directions d ranging from 90 degrees (i.e., azimuth true North) to 100 degrees. The table attempts to show that the hypothesizer 220 determines the predicted Doppler effect 222 for each combination of predicted speed s and predicted direction d. In other words, for the first speed s1 of 1.0 m/s, the hypothesizer 220 determines the predicted Doppler effect 222 for each predicted direction d. As the ellipses illustrates, this hypothesizer 220 continues to determine the predicted Doppler effect 222 for each predicted speed s (e.g., eleven different speeds in increments of 0.1 m/s). Based on all of the predicted Doppler effects 222a-n for all satellites 20a-n, the optimizer 230 compares these predicted Doppler effects 222 to the measured Doppler effect 202. Here, in this example, the optimizer 230 assigns an overall likelihood 234 to the depicted grid point 214 that represents how well the predicted Doppler effects 222 for each satellite 20 in the aggregate matches the measured Doppler effect 202 for each satellite 20.

Optionally, the Doppler predictor 200 and/or locational system 120 may determine the actual position $12_A$ of the receiver 114 at consecutive times (e.g., at $t_0$ and $t_1$ of FIG. 1B). When the Doppler predictor 200 and/or locational system 120 has determined the actual position $12_A$, these systems 120, 200 may leverage prior knowledge or determinations in order to determine the actual position $12_A$ at a current time. In some examples, to leverage prior knowledge, these systems 120, 200 employ a Dynamic filter (e.g., a Kalman Filter, Particle Filter, etc.) that makes use of the previously determined position $12_A$ and/or previously determined actual speed s. Although different variations of a Dynamic filter may have been combined with conventional GNSS localization, the inaccuracies of the conventional GNSS localization also similarly plagued Dynamic filtering when it was combined with the conventional GNSS localization.

Figure 3:
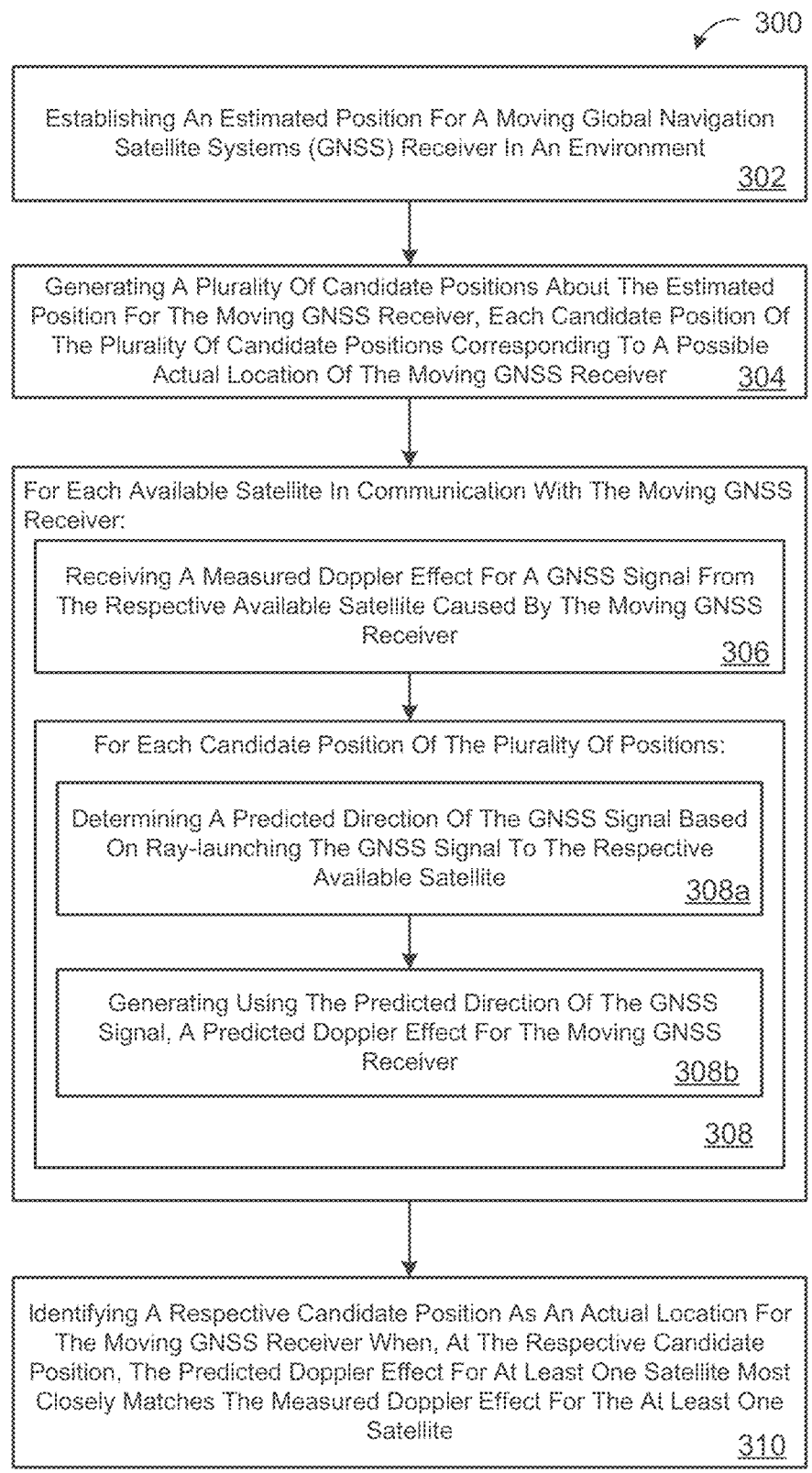
FIG. 3 is a flowchart of an example arrangement of operations for a method of localization using Doppler shifts of reflected signals.

FIG. 3 is a flowchart of an example arrangement of operations for a method 300 of localization using Doppler shifts of reflected signals. At operation 302, the method 300 establishes an estimated position $12_{EST}$ for a moving Global Navigation Satellite Systems (GNSS) receiver 114 in an environment 100. At operation 304, the method 300 generates a plurality of candidate positions 214a-n about the estimated position $12_{EST}$ for the moving GNSS receiver 114. Each candidate position 214 of the plurality of candidate positions 214a-n corresponds to a possible actual location $12_A$ of the moving GNSS receiver 114. For each available satellite 20 in communication with the moving GNSS receiver 114, at operation 306, the method 300 receives a measured Doppler effect 202 for a GNSS signal 22 from the respective available satellite 20 caused by the moving GNSS receiver 114. At operation 308, the method 300 performs two sub-operations 308a-b for each available satellite 20 in communication with the moving GNSS receiver 114. At operation 308a, the method 300, at each candidate position 214 of the plurality of candidate positions 214a-n, determines a predicted direction of the GNSS signal 22 based on ray-launching the GNSS signal 22 to the respective satellite 20. At operation 308b, the method 300 generates, using the predicted direction $22_A$ of the GNSS signal 22, a predicted Doppler effect 222 for the moving GNSS receiver 114. At operation 310, the method 300 identifies a respective candidate position 214 as an actual location $12_A$ for the moving GNSS receiver 114 when, at the respective candidate position 214, the predicted Doppler effect 222 for at least one satellite 20 (e.g., one satellite, two or more satellites, a collection of satellites, or all satellites) most closely matches the measured Doppler effect 202 for the at least one satellite 20.

Figure 4:
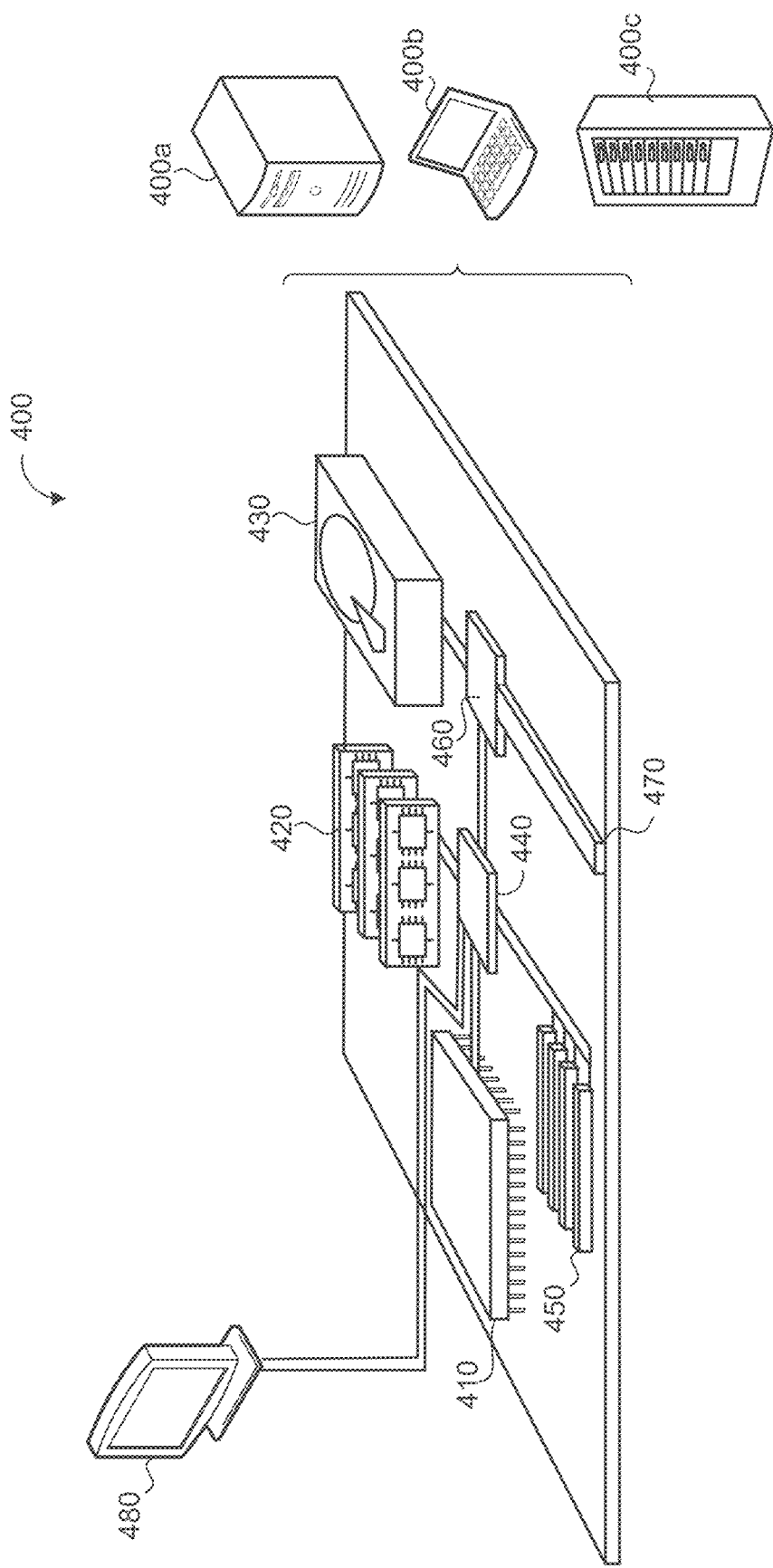
FIG. 4 is a schematic view of an example computing device that may be used to implement the systems and methods described herein.

FIG. 4 is schematic view of an example computing device 400 that may be used to implement the systems (e.g., the locational system 120, the Doppler predictor 200, and/or the ray launching tool 122) and methods (e.g., method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 450, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    establishing, by data processing hardware, an estimated position for a moving Global Navigation Satellite Systems (GNSS) receiver in an environment;
    generating, by the data processing hardware, a plurality of candidate positions about the estimated position for the moving GNSS receiver, each candidate position of the plurality of candidate positions corresponding to a possible actual location of the moving GNSS receiver;
    for each available satellite in communication with the moving GNSS receiver:
        receiving, at data processing hardware, a measured Doppler effect for a GNSS signal from the respective available satellite caused by the moving GNSS receiver; and
        at each candidate position of the plurality of candidate positions:
            determining, by the data processing hardware, a set of predicted directions of the GNSS receiver and a set of predicted speeds of the GNSS receiver;
            determining, by the data processing hardware, a set of predictions pairs, each prediction pair comprising a respective one of the predicted directions in the set of predicted directions and a respective one of the predicted speeds in the set of predicted speeds; and
            for each prediction pair in the set of prediction pairs, generating, by the data processing hardware, using the respective one of the predicted directions and the respective one of the predicted speeds of the GNSS receiver, a predicted Doppler effect for the moving GNSS receiver; and
    identifying, by the data processing hardware, a respective candidate position as an actual location for the moving GNSS receiver when, at the respective candidate position, the respective one of the predicted Doppler effects for at least one satellite most closely matches the measured Doppler effect for the at least one satellite.

2. The method of claim 1, further comprising:
at each candidate position of the plurality of candidate positions, assigning, by the data processing hardware, a likelihood to the corresponding candidate position indicating a measure of how closely the respective one of the predicted Doppler effects at the corresponding candidate position for the available satellite matches the measured Doppler effect for the available satellite,
wherein identifying the respective candidate position as the actual location for the moving GNSS receiver comprises selecting the respective candidate position from among the plurality of candidate positions that has a greatest assigned likelihood.

3. The method of claim 2, wherein the likelihood comprises a difference between the measured Doppler effect and the respective one of the predicted Doppler effects at the corresponding candidate position.

4. The method of claim 1, further comprising:
at each candidate position of the plurality of candidate positions, determining, by the data processing hardware, a sum of squares between the respective one of the predicted Doppler effects at the corresponding candidate position for the at least one satellite and the measured Doppler effect for the at least one satellite,
wherein the respective candidate position comprises a minima for the sum of squares between the respective one of the predicted Doppler effects at the corresponding candidate position for the at least one satellite and the measured Doppler effect at the corresponding candidate position for the at least one satellite.

5. The method of claim 1, wherein the plurality of candidate positions about the estimated position of the moving GNSS receiver defines a grid of positions.

6. The method of claim 1, wherein the GNSS signal comprises a signal path having a plurality of reflections within the environment.

7. The method of claim 1, further comprising:
identifying, by the data processing hardware, the respective one of the predicted Doppler effects that most closely matches the measured Doppler effect at the corresponding candidate position; and
determining, by the data processing hardware, using the respective one of the predicted Doppler effects identified as most closely matching the measured Doppler effect, a speed of the moving GNSS receiver.

8. The method of claim 1, wherein establishing the estimated position for the moving GNSS receiver comprises obtaining the estimated position for the moving GNSS receiver from a locational system of a GNSS-enabled device associated with the moving GNSS receiver.

9. The method of claim 1, wherein determining the set of predicted directions comprises obtaining the set of predicted directions from a ray-launching tool in communication with the data processing hardware.

10. The method of claim 9, wherein the ray-launching tool is configured to:
receive a building model for the environment;
determine a location corresponding to the respective available satellite transmitting the GNSS signal; and
at each candidate position of the plurality of candidate positions:
determine a ray that launches from the corresponding candidate position to the location of the respective available satellite; and
generate the set of predicted directions of the GNSS receiver based on a signal angle for the determined ray that launches from the corresponding candidate position to the location of the respective satellite.

11. A system comprising:
data processing hardware; and
memory hardware in communication with the data processing hardware, the memory hardware storing instructions that when executed on the data processing hardware cause the data processing hardware to perform operations comprising:
establishing an estimated position for a moving Global Navigation Satellite Systems (GNSS) receiver in an environment;
generating a plurality of candidate positions about the estimated position for the moving GNSS receiver, each candidate position of the plurality of candidate positions corresponding to a possible actual location of the moving GNSS receiver;
for each available satellite in communication with the moving GNSS receiver:
receiving a measured Doppler effect for a GNSS signal from the respective available satellite caused by the moving GNSS receiver; and
at each candidate position of the plurality of candidate positions:
determining a set of predicted directions of the GNSS receiver and a set of predicted speeds of the GNSS receiver;
determining a set of predictions pairs, each prediction pair comprising a respective one of the predicted directions in the set of predicted directions and a respective one of the predicted speeds in the set of predicted speeds; and
for each prediction pair in the set of prediction pairs, generating, by the data processing hardware, using the respective one of the predicted directions and the respective one of the predicted speeds of the GNSS receiver, a predicted Doppler effect for the moving GNSS receiver; and
identifying a respective candidate position as an actual location for the moving GNSS receiver when, at the respective candidate position, the respective one of the predicted Doppler effects for at least one satellite most closely matches the measured Doppler effect for the at least one satellite.

12. The system of claim 11, wherein the operations further comprise:
at each candidate position of the plurality of candidate positions, assigning a likelihood to the corresponding candidate position indicating a measure of how closely the respective one of the predicted Doppler effects at the corresponding candidate position for the available satellite matches the measured Doppler effect for the available satellite,
wherein identifying the respective candidate position as the actual location for the moving GNSS receiver comprises selecting the respective candidate position from among the plurality of candidate positions that has a greatest assigned likelihood.

13. The system of claim 12, wherein the likelihood comprises a difference between the measured Doppler effect and the respective one of the predicted Doppler effects at the corresponding candidate position.

14. The system of claim 11, wherein the operations further comprise:
at each candidate position of the plurality of candidate positions, determining a sum of squares between the respective one of the predicted Doppler effects at the corresponding candidate position for the at least one satellite and the measured Doppler effect for the at least one satellite, wherein the respective candidate position comprises a minima for the sum of squares between the respective one of the predicted Doppler effects at the corresponding candidate position for the at least one satellite and the measured Doppler effect at the corresponding candidate position for the at least one satellite.

15. The system of claim 11, wherein the plurality of candidate positions about the estimated position of the moving GNSS receiver defines a grid of positions.

16. The system of claim 11, wherein the GNSS signal comprises a signal path having a plurality of reflections within the environment.

17. The system of claim 11, wherein the operations further comprise:
identifying the respective one of the predicted Doppler effects that most closely matches the measured Doppler effect at the corresponding candidate position; and
determining using the respective one of the predicted Doppler effects identified as most closely matching the measured Doppler effect, a speed of the moving GNSS receiver.

18. The system of claim 11, wherein establishing the estimated position for the moving GNSS receiver comprises obtaining the estimated position for the moving GNSS receiver from a locational system of a GNSS-enabled device associated with the moving GNSS receiver.

19. The system of claim 11, wherein determining the set of predicted directions comprises obtaining the set of predicted directions from a ray-launching tool in communication with the data processing hardware.

20. The system of claim 19, wherein the ray-launching tool is configured to:
receive a building model for the environment;
determine a location corresponding to the respective available satellite transmitting the GNSS signal; and
at each candidate position of the plurality of candidate positions:
determine a ray that launches from the corresponding candidate position to the location of the respective available satellite; and
generate the set of predicted directions of the GNSS receiver based on a signal angle for the determined ray that launches from the corresponding candidate position to the location of the respective satellite.

* * * * *